United States Patent [19]

Stiegelmeier

[11] 4,322,200
[45] Mar. 30, 1982

[54] HEAVY DUTY IMPELLER

[76] Inventor: Owen E. Stiegelmeier, 698 Wyleswood Dr., Berea, Ohio 44017

[21] Appl. No.: 36,327

[22] Filed: May 7, 1979

Related U.S. Application Data

[60] Division of Ser. No. 829,563, Aug. 31, 1977, Pat. No. 4,155,151, which is a continuation-in-part of Ser. No. 656,539, Feb. 9, 1976, abandoned.

[51] Int. Cl.³ ............................................. F04D 29/30
[52] U.S. Cl. ................................ 416/184; 416/186 R; 416/188; 416/213 R
[58] Field of Search ................... 416/184, 186 R, 188, 416/213 R, 199; 415/213 R, 215; 29/156.8 CF; 113/116 D

[56] References Cited

U.S. PATENT DOCUMENTS

| | | | |
|---|---|---|---|
| 541,000 | 6/1895 | Morris | 29/158.6 CF |
| 1,003,849 | 9/1911 | Worth . | |
| 1,061,797 | 5/1913 | Worth . | |
| 1,112,324 | 9/1914 | Rice . | |
| 2,691,812 | 10/1954 | Misch . | |
| 2,766,699 | 10/1956 | Bayless | 416/186 |
| 2,807,871 | 10/1957 | Wagner et al. | 416/213 R |
| 2,975,959 | 3/1961 | Foster . | |
| 3,021,803 | 2/1962 | Lacey, Jr. . | |
| 3,107,627 | 10/1963 | Clarke et al. . | |
| 3,222,765 | 12/1965 | Parent et al. . | |
| 3,236,341 | 2/1966 | Chopinet et al. . | |
| 3,260,443 | 7/1966 | Garnett et al. | 29/156.8 CF |
| 3,287,950 | 11/1966 | Grankowski . | |
| 3,294,027 | 12/1966 | Denis | 416/184 |
| 3,298,444 | 1/1967 | Haas . | |
| 3,507,581 | 4/1970 | Jensen . | |
| 3,945,101 | 3/1976 | Rossmann et al. . | |
| 3,991,598 | 11/1976 | Kraft . | |

FOREIGN PATENT DOCUMENTS

| | | | |
|---|---|---|---|
| 140542 | 3/1951 | Australia | 416/186 R |
| 510266 | 4/1952 | Belgium . | |
| 942107 | 4/1956 | Fed. Rep. of Germany | 416/186 |
| 971389 | 1/1959 | Fed. Rep. of Germany | 416/184 |
| 1092947 | 4/1955 | France | 416/213 |
| 1143291 | 9/1957 | France . | |
| 412321 | 6/1934 | United Kingdom | 416/184 |
| 445005 | 4/1936 | United Kingdom . | |

OTHER PUBLICATIONS

Hilton, B. Richard, *Welding Design and Processes*, Chapman and Hall, Ltd., London, 1950, pp. 54–55.

Primary Examiner—Leonard E. Smith
Attorney, Agent, or Firm—Maky, Renner, Otto & Boisselle

[57] ABSTRACT

A fabricated, heavy duty centrifugal pump impeller wherein the relatively heavy gauge shrouds are formed by plastic deformation such as by metal spinning, stretch forming or hydroforming. The hub is similarly formed and a plurality or regularly circumferentially spaced spiral vanes extend axially therebetween so that when the hub, blades and shroud are joined by welding or brazing, there is formed a heavy duty impeller having an axially extending inlet and a radially extending annular outlet. Following the fabrication, the impeller is finished and metallized.

7 Claims, 8 Drawing Figures

HEAVY DUTY IMPELLER

CROSS-REFERENCE TO RELATED APPLICATION

This is a division of application Ser. No. 829,563, filed Aug. 31, 1977, now U.S. Pat. No. 4,155,151, which is a C-I-P of Ser. No. 656,539, filed Feb. 9, 1976 now abandoned.

This invention relates generally as indicated to a heavy duty impeller and method of fabricating the same. Impellers, for large water pumps, for example, which are the rotating part of the pump, are normally cast. This has been considered a necessity in view of the size, weight, and complexity of the surfaces and openings therethrough. While smaller or lighter weight impellers used in connection with blowers or relatively small liquid pumps can readily be fabricated, this is not true with large heavy duty impellers such as those employed in large double or single-suction water pumps. A double-suction pump has opposed axial inlets while a single-suction pump has only one.

The weight of the impeller together with the thicknesses of the metal involved have not made such impellers susceptible to ready fabrication. Because of the increasing shortage of job shop foundries and their continuing unreliability as a source of supply, applicant has devised a method of fabricating such heavy duty impellers wherein the cost of the same is equal to or less than that of a cast impeller.

The present invention pertains particularly to large heavy duty impellers such as those employed in centrifugal pumps. The advantages of the present invention are particularly beneficial in the production of centrifugal shrouded type impellers and especially the double or single-suction type. They may weight, for example, on the order of several hundred pounds, or more.

It is accordingly a principal object of the present invention to provide a fabricated impeller which does not require resort to complex casting techniques.

Another important object is the provision of a method of fabricating such heavy duty impellers wherein the shrouds and hub halves are plastically deformed by overstressing the material over a broad enough area that the material does not fracture.

Another important object is the provision of a shrouded centrifugal impeller wherein the relatively thick metal shrouds are formed by metal spinning techniques.

Another object is the provision of such impeller wherein the shrouds are formed by hydroforming or stretch forming.

Yet another important object is the provision of a fabricated impeller wherein the parts, following forming, can be secured together by welding followed by finishing and metallizing such that the appearance and performance is fully equivalent to that of a cast impeller.

For most impellers and particularly smaller size impellers, it is preferred that the outer vane part 34 not be positioned and tacked as indicated above, until the vane parts 32 and 33 are finished welded in the appropriate 1" passes set forth above. In this manner the finished hub and outer shrouds with the vane parts 32 and 33 tacked therebetween are removed from the jig for inspection and finish welding before the outer vane parts 34 are positioned, tacked, inspected, finish welded, and balanced in that order. Because of the significant spiral of the vanes, the placement of the vane part 34 last provides easier access to the inner vane parts 32 and 33 for finish welding. In the largest size impellers, the openings may be of sufficient size so as not to require the outer vane part be positioned last. It will be appreciated that the outer vane part may in fact be several separate parts positioned in the manner described from the hub outwardly.

A further object is the provision of a fabricated impeller wherein the parts are fabricated, shaped and size selected, so they can be assembled and welded together quickly and conveniently to form the complete impeller.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

Figure 1:
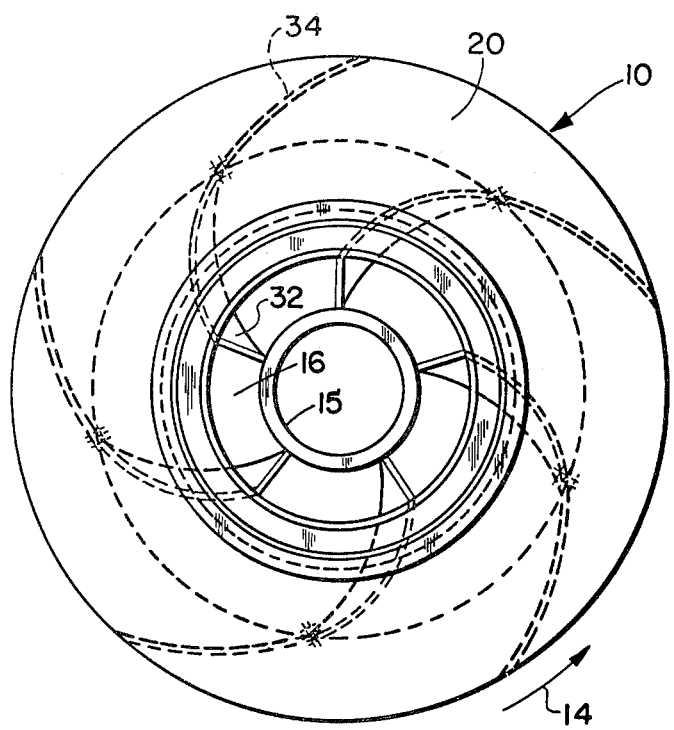
FIG. 1 is an end elevation of a double-suction impeller in accordance with the invention seen from the axis of the impeller.
Figure 2:
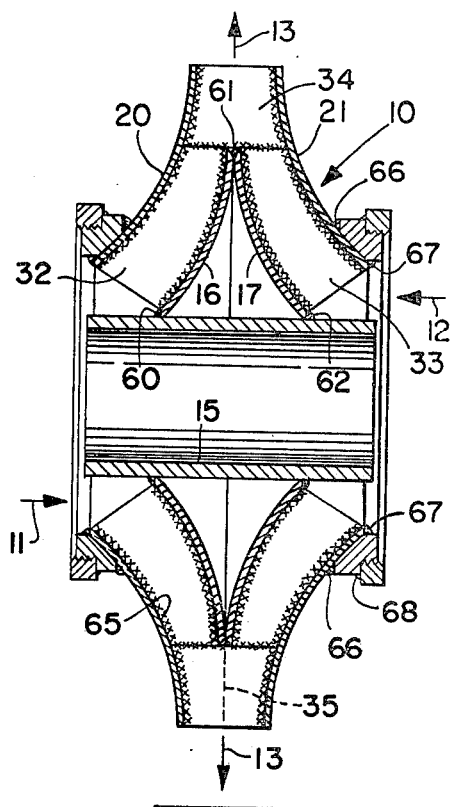
FIG. 2 is a generally diametrical section of the assembled impeller taken through the axis thereof.
Figure 3:
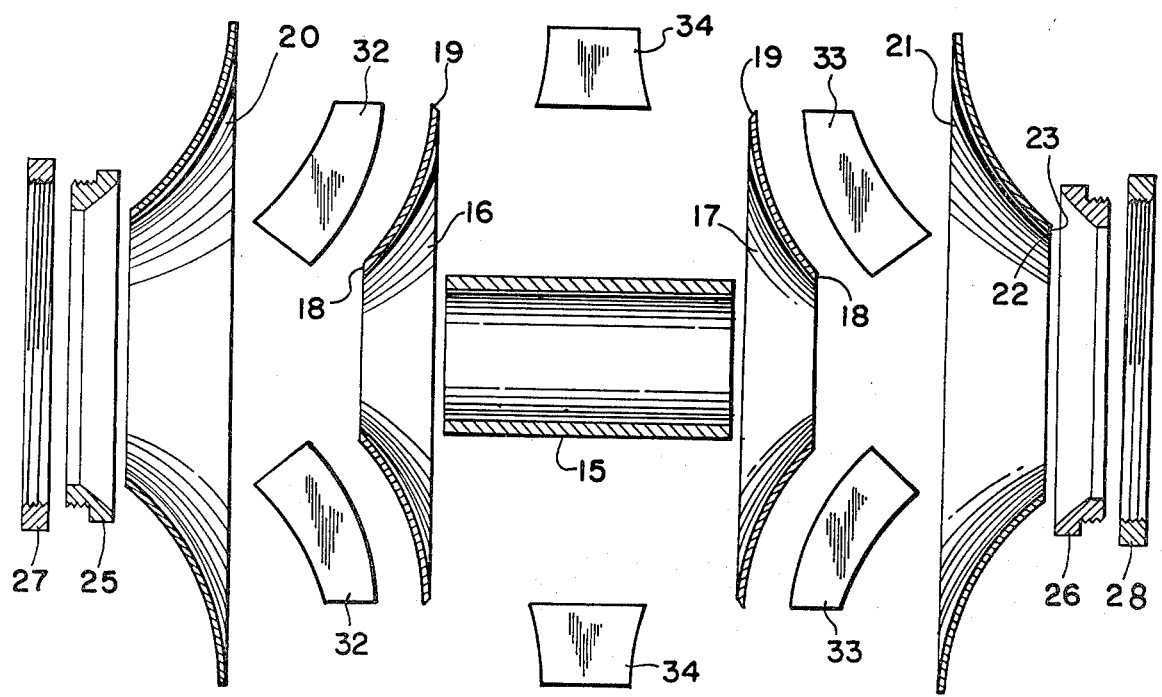
FIG. 3 is an exploded, somewhat schematic illustration of the parts of the impeller with only two of the five Y-shape vanes being shown schematically.

Referring first to FIGS. 1, 2 and 3, there is illustrated generally at 10 a fabricated impeller in accordance with the present invention, such impeller being of the centrifugal double-suction type. It will, however, be appreciated that much of the present invention is equally applicable to single-suction pumps. When rotated, fluid will be drawn axially into the impeller as indicated by the arrows 11 and 12 and expelled radially as indicated by the arrows 13. The impeller, of course, runs in the direction of arrow 14 in a suitable housing having axial inlets and a circumferential volute outlet passage.

Referring initially to FIGS. 2 and 3, it will be seen that the impeller of the present invention comprises a tubular hub center member 15, which may be fabricated from a pipe section, and shaped hub halves 16 and 17 which are identical in form. Each of the hub halves is provided with a center aperture to be assembled on the hub center 15. The O.D. of the hub halves, indicated at 19, may be provided with opposed 45° bevels to facilitate fabrication as set forth hereinafter. When thus assembled, the hub center 15 together with the hub halves 16 and 17 form the hub of the impeller.

The hub center 15, of course, receives the impeller drive shaft which is drivingly connected thereto, generally by a key and keyway.

Of the same general configuration as the hub halves 16 and 17, but larger in size, are shrouds 20 and 21. Such shrouds have a larger diameter I.D. or interior opening 22, such opening being formed by axially facing end walls 23.

To the outside of the shrouds 20 and 21 there is secured transition rings 25 and 26 to which impeller seal rings 27 and 28 are threadedly connected.

The equally spaced spirally formed vanes indicated at 30 are each formed of several parts. There may be approximately five to seven vanes. They must, of course, be equally spaced circumferentially, both at their inner and outer ends.

Such blades extend axially between the shrouds beyond the hub and also axially between the shroud and the inner hub half. For double-suction impeller such as the one illustrated, the vanes, when assembled, are in the form of the Y illustrated. Such vanes may be formed of two pieces, or as illustrated in FIGS. 2 and 3, preferably of three pieces. The three pieces comprising a single vane are illustrated at 32, 33 and 34 in FIG. 3. Because of the spiral shaping of the vanes, such vane parts are illustrated greatly foreshortened from their actual length. The vane part 32 extends between the shroud 20 and the inner hub half 16 while the vane part 33 extends between the shroud 21 and the inner hub half 17. The vane part 34 which constitutes the tip of the vane beyond the hub extends between the shrouds 20 and 21. If only two vane parts are employed, the parts 32 and 33 would be extended and seam welded together along the dotted line indicated at 35 in FIG. 2.

The shroud and inner hub halves will be formed as described below in connection with the embodiments of FIGS. 4 through 8. The blade parts, after being blanked or cut to the desired shape, are die formed or press formed to the required spiral shape. The hub center, of course, may be made from a piece of pipe and the interior rounded, although not necessarily finished, for centering purposes as hereinafter described.

Figure 4:
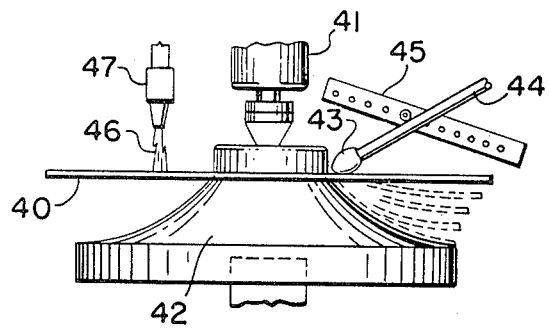
FIG. 4 is a schematic illustration of the manner in which the shrouds may be formed utilizing a metal spinning technique.
Figure 5:
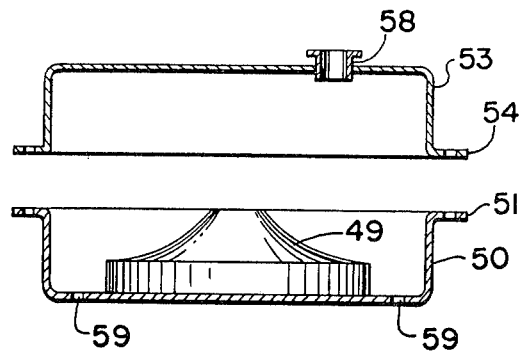
FIGS. 5–8 are schematic illustrations showing how the shrouds may be stretch formed utilizing an hydroforming technique.
Figure 6:
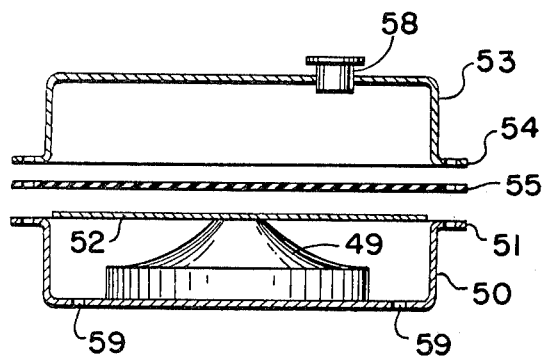

Both the hub halves and the shrouds may be formed by the technique illustrated in FIGS. 4 through 8. The preferred method of forming such parts is by metal spinning as illustrated in FIG. 4. The circular blank or disk 40 is held in a metal spinning chuck 41, one portion of which comprises the pattern 42. A spinning tool 43 journalled on mandrel 44 is held by steady rest or positioning tool shown schematically at 45 such that it can be forced against the blank on the opposite side of the pattern 42. In practice, a fluid motor with controlled pressure will exert the required force. The spinning tool 43 is traversed radially of the spinning blank. For larger gauges, it is preferred to apply heat to the blank as illustrated by the flame 46. The source of the flame, illustrated as a torch 47, may be moved both axially and radially of the spinning blank. Surprisingly, it has been found that metal thicknesses up to 9.525 mm can be successfully formed with the metal spinning technique illustrated. The normal thickness of the hub halves and shrouds may vary from 3.1750 mm to approximately 9.525 mm.

Figure 7:
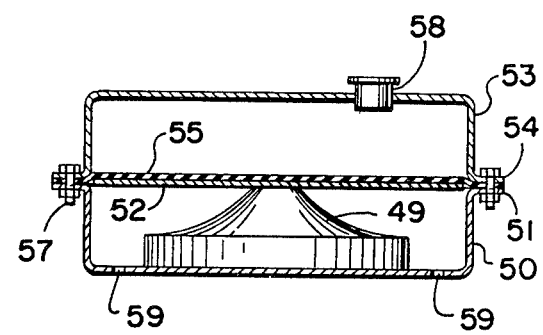
Figure 8:
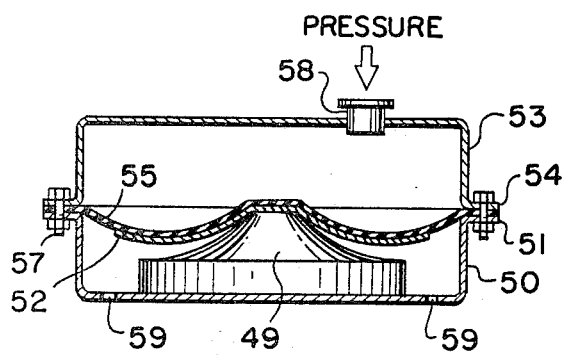

In FIGS. 5 through 8 there is illustrated another method of forming such hub halves and shrouds, such method being by hydroforming or stretch forming. A pattern 49 is placed in the bottom of a drag or container 50 which is provided with a peripheral flange 51. A blank 52 is positioned over the pattern and centered with respect thereto. A cope 53 which has a similar configuration to the drag 50 is provided with a peripheral flange 54. A diaphragm 55 is positioned between the opposed flanges 54 and 51 over the top of the centered blank 52. The cope and drag is then secured together as seen in FIG. 7 by suitable clamping fasteners 57. Fluid under pressure such as water, is then applied to the cope through the inlet 58 and pressure is built up until the blank collapses over the pattern 49 as indicated in FIG. 8. The drag is provided with vent openings as indicated at 59. When the blank has achieved its final position against the pattern, the pressure is relieved, the parts separated, and the shaped blank is removed. After shaping, the blanks may be cut or turned to the desired accuracy for both the O.D. and I.D. as indicated in FIG. 3.

ASSEMBLY

After the required parts are shaped and formed, they may be assembled in the following manner. The two hub halves are positioned on the hub center equidistant from the ends. The parts are secured together by annular fillet weld 60, 61 and 62 seen in FIG. 2. The fillet welds 60 and 62 may be placed in the right angle corners between the walls 18 and the O.D. of the hub center while the fillet weld 61 is placed in the right angle corner formed by the opposed bevels 19.

With the hub thus preassembled, one of the shrouds, for example, 21, is supported horizontally with its axis vertical on a jig. The vane parts 33 are then positioned on the shroud and lightly tack welded in place. The preassembled hub is then brought down on the vane parts 33 with a special plug or pilot projecting into the rounded hole on the hub center. The hub is then tack welded to the vane parts 33 and additionally the vane parts 34 and 32 are lightly tacked into place. Finally, the outer shroud 20 is tacked to the vane parts 32 and 34. After being tack welded assembled, the impeller is removed from the jig for inspection to ascertain that the vanes are properly positioned and, more importantly, properly spaced from each other both at their inner and outer ends. If the assembly is properly centered and assembled, the parts are then welded in passes of about 1" at a time, such welding passes not normally being adjacent to each other to avoid distortion.

Such welding passes are indicated generally at 65.

For most impellers and particularly smaller size impellers, it is preferred that the outer vane part 34 not be positioned and tacked as indicated above, until the vane parts 32 and 33 are finished welded in the appropriate 1" passes set forth above. In this manner the finished hub and outer shrouds with the vane parts 32 and 33 tacked therebetween are removed from the jig for inspection and finish welding before the outer vane parts 34 are positioned, tacked, inspected, finish welded, and balanced in that order. Because of the significant spiral of the vanes, the placement of the vane part 34 last provides easier access to the inner vane parts 32 and 33 for finish welding. In the largest size impellers, the openings may be of sufficient size so as not to require the outer vane part be positioned, last. It will be appreciated that the outer vane part may in fact be several separate parts positioned in the manner described from the hub outwardly.

After welding, the inlet eyes or the I.D. of the shrouds are trued up in a lathe on an expanding mandrel and the final step in assembly is to position on and weld the transition rings 25 and 26. This may be accomplished by annular fillet welds indicated at 66 and 67, the latter being placed in the right angle corner between the end wall 23 and the I.D. of the transition ring. The seal rings are then threaded on the transition rings and such rings may be brazed as indicated at 68, depending upon the particular material thereof. Such rings may be stainless steel or bronze, and if bronze, brazing may be employed.

It is preferred to employ a M.I.G. (metal inert gas) welding technique and hard to reach places may be done by a flux coated electrode welding process. Depending upon the types of metals involved, a T.I.G. (tungsten inert gas) process may be employed. For smaller impellers, furnace brazing may be employed in lieu of welding.

After welding, the impeller is finished and metallized.

The shrouds and hub, when assembled with the spiral vanes therebetween, have the complex shape of generally conjugate hyperboloids, but such shapes can readily be obtained with the techniques disclosed, even for the relatively heavy gauge metals require for heavy duty impellers. However, with the techniques disclosed, an impeller of low cost can be obtained.

With the processes and fabrication techniques disclosed, an impeller is provided having substantially all of the appearance of a cast impeller, but some significant improvements over a cast impeller. For example, the impeller of the present invention is nearly always repairable. The pumps of the type for which such impellers are used may ingest all kinds of trash. The impeller then simply acts as a grinder. If a blade or vane is broken it is thrown out of balance. A casting, generally speaking, is not normally repaired, but is scrapped. Its value then is about $45.00 per ton. Also, unexpectedly, the fabricated impeller of the present invention has more capacity per given shroud separation and given diameter. This is apparently because the shrouds, vanes and fillets are smaller than on castings. The fabricated impeller of the present invention is also more accurate and has better uniformity than a casting. Cores and patterns in a casting of the type and complexity involved tend to shift and such castings are not normally uniformly precise. Moreover, because of the economics in job shop foundries, supply of castings is unreliable. When a large pump is down, it can be an expensive proposition. With a casting there is less flexibility in design since design is limited to the patterns available, and such tooling is considerably more costly then the tooling required for the present invention. The impeller of the present invention is lighter in weight requiring less horsepower or energy consumption on start-up. The fabricated impeller of the present invention can be made of substantially any metal or alloy such as stainless steel which may be used in pumping corrosive liquids. For a reason not fully understood, castings tend to wear out faster. This is apparently due to porosity of the casting resulting in explosive expansion in areas of cavitation. Additionally, the impeller of the present invention is easier to balance. Weights may readily be welded on where desired. With a casting, heavy areas must be ground off. Finally, the cost of the impeller of the present invention is significantly less than the cost of a comparable casting.

I, therefore, particularly point out and distinctly claim as my invention:

1. A fabricated heavy duty impeller comprising a shaped outer shroud and a shaped hub, a plurality of regularly circumferentially spaced spiral vanes extending axially therebetween to provide an axially extending inlet and a radially extending annular outlet when said impeller is rotated in one direction, continuous weldments securing said shroud, vanes and hub integrally together, each of said vanes being formed from a plurality of pieces secured integrally together by continuous transverse weldment, the impeller being of the double-suction type, the hub being formed by two shaped hub halves mounted on and secured to a tubular member, and two shaped outer shrouds on each side thereof, the spiral formed vanes extending between the hub halves and respective shrouds, and between the shrouds beyond the hub, the vanes being each fabricated from three parts, two of the parts extending between the hub half and respective shroud, and the third extending between the shrouds beyond the hub.

2. An impeller as set forth in claim 1 wherein the shaped hub is mounted on and secured to a tubular member with said vanes extending axially from the shaped portion of said hub, the shaped outer shroud being secured to said vanes.

3. An impeller as set forth in claim 1 wherein the shroud and shaped portion of the hub are formed by elastic deformation of heavy gauge metal.

4. An impeller as set forth in claim 1 wherein the I.D. of the hub halves are provided with axially facing end walls extending normal to the axis of the impeller to facilitate fillet welding to the hub center.

5. An impeller as set forth in claim 4 wherein the O.D. of each hub half is beveled to facilitate fillet welding of the hub halves to each other.

6. An impeller as set forth in claim 1 including a transition ring welded to the exterior of the shroud at the I.D. thereof.

7. An impeller as set forth in claim 6 wherein the I.D. of the shroud is provided with an axially facing end wall extending normal to the I.D. of the transition ring to facilitate fillet welding to the transistion ring.

* * * * *